Aug. 30, 1955 F. L. KAHN 2,716,674

IDENTIFICATIONS OF LINE PERMANENTS

Filed Dec. 16, 1953

2 Sheets-Sheet 1

INVENTOR.
FREDERICK L. KAHN

BY Wm. Walter Owen.

ATTY.

Aug. 30, 1955 F. L. KAHN 2,716,674

IDENTIFICATIONS OF LINE PERMANENTS

Filed Dec. 16, 1953 2 Sheets-Sheet 2

INVENTOR.
FREDERICK L. KAHN
BY Mc Walter Owen
ATTY.

2,716,674

IDENTIFICATIONS OF LINE PERMANENTS

Frederick L. Kahn, Chicago, Ill., assignor to Automatic Electric Laboratories, Inc., Chicago, Ill., a corporation of Delaware Application December 16, 1953, Serial No. 398,573

8 Claims. (Cl. 179—27)

The present invention relates to telephone systems in general, but is concerned more particularly with telephone systems in which provisions are made to identify false calls. These false calls are caused by faulty line conditions and are commonly known as permanents. Permanents of this nature may be caused by the negative subscriber line conductor being grounded; by the subscriber line conductors being shorted; or by an accidental removal of the handset from the telephone instrument.

The principal object of this invention is the provision of suitable arrangements, whereby a signal is given to the maintenance man upon his operation of a checking key, whenever permanents exist on any of the lines. The signal comprises a lamp associated with a finder, and is cased to be illuminated to indicate a permanent and the finder locked thereto; while the location of the finder wipers would at the same time indicate the calling line that is causing such trouble.

In the prior arrangements such permanents were only indicated by a signal lamp associated with each selector, and the maintenance man, when observing such a signal, would need to trace out and find the finder linked with that selector in order to check the position of its wipers to locate the line in trouble. In the present arrangement with the signal directly associated with the finder, considerable time is saved by the maintenance man.

Referring now to the drawings comprising Figs. 1, 2 and 3, they show by means of the usual circuit diagrams a sufficient amount of apparatus in a system embodying the principles of the invention to enable the invention to be thoroughly understood.

Figure 1:
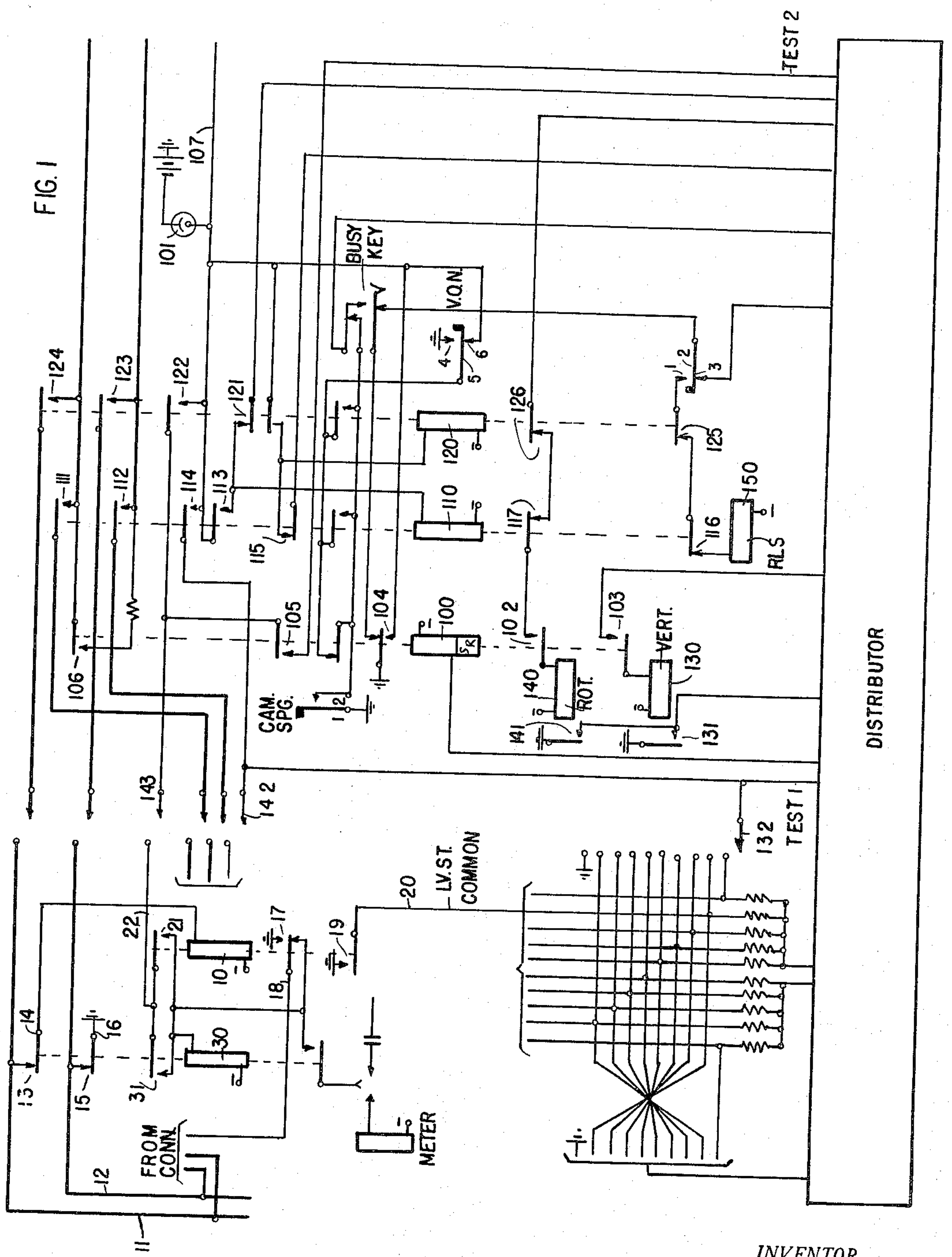
Fig. 1 shows the line circuit and a linefinder circuit with a glow discharge lamp connected to the control lead thereof.
Figures 2, 3:
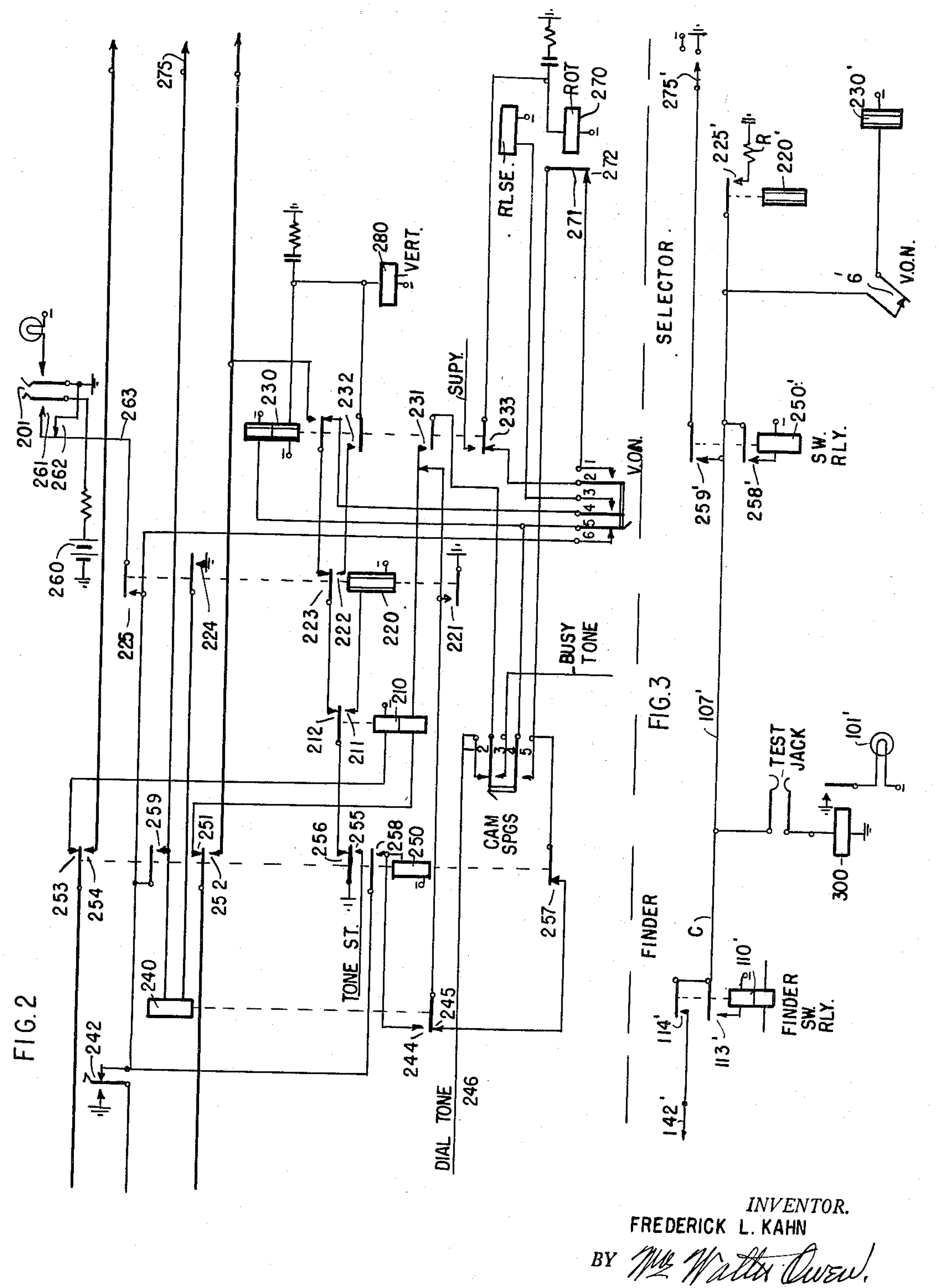
Fig. 2 shows a selector circuit, wherein a checking key is operable to connect booster battery to the selector control lead.
Fig. 3 shows a modified scheme, in which a common relay and a checking lamp are associated with a group of linefinders.

Referring now to Figs. 1 and 2 in detail, the line circuit and linefinder circuit shown here may be of the conventional type such as disclosed by U. S. Patent No. 2,214,908, issued on September 17, 1940, to C. E. Lomax et al. A glow discharge lamp such as 101 is associated with each finder of the system, this lamp requires a voltage of about 90 volts D. C. to start glowing, and ceases to glow at about 55 volts. Normally, this lamp will not operate until 45 volt booster battery is placed on the control lead by the manipulation of a checking key 201 associated with the selector linked to that finder. It may be pointed out that the current will only flow into lamp 101, when contacts 225 remain closed. Should the first selector switch through to the succeeding switch, relay 220 would then restore in a well known manner and contacts 225 would then be opened. The lamp will not operate under this condition, even though the checking key is operated, bearing in mind that the booster battery is always disconnected from the control lead whenever contact 225 opens.

A better understanding of the connection and arrangement of the apparatus incorporated in the telephone system will be facilitated from a consideration of the operation thereof incident to the extension of a call. The call is first initiated by removing the receiver of the telephone instrument (not shown) to complete a bridge path between line conductors 11 and 12 which circuit extends from ground at 16 by way of contacts 15, the bridge path between the line conductors 11 and 12 and contacts 13 and the winding of relay 10 to battery. When energized over the above-traced circuit the line relay 10 operates to complete, at contacts 17, an obvious path for applying ground potential to the control conductor 18 thereby to mark the subscriber line as busy to the connector switches having access thereto. Also, the line relay 10 completes, at contacts 19, an obvious path for applying ground potential to the control conductor 20, thereby to cause ground potential to be applied by way of Level Start commons extending into the distributor indicated by a square. Also, upon operating, the line relay 10 completes at contacts 21, a path for applying battery potential to the control conductor 22 of the subscriber line, thereby to mark the rotary positions of the calling line in the contact banks of the finder switches having access to the subscriber line. This path for applying battery potential to the control conductor 22 and the finder bank contacts extends from battery at the winding of the cut-off relay 30, by way of contacts 21 to control conductor 22. It is understood that by the grounding of conductor 20 the distributor start relay (not shown) is operated to cause the preselected one of the idle finder-selector links to be assigned to the use of the calling subscriber line in a well known manner.

The circuit for energizing the start relay 100 in the finder switch extends from the distributor in a well known manner. When energized the start relay 100 closes contacts 103 to step the vertical magnet 130, closes contacts 102 to prepare a circuit to the rotary magnet 140, closes contacts 104 to place ground on the control lead so as to operate the selector relay 230, closes contacts 105 to prepare a circuit for the test 2 lead of the distributor to wiper 143 and closes contacts 106 to put the 500 ohm non-inductive resistance across the selector negative and positive conductors for operating the selector line relay 210.

Specifically, the circuit for energizing selector relay 230 extends from ground contacts 104 of Fig. 1, control conductor 107, contacts 242, V. O. N. springs 6 and 5 and the upper winding of series relay 230 to battery. The circuit for energizing selector line relay 210 extends from ground on dial tone lead 246 by way of cam springs 1 and 2, contacts 231, the lower winding of relay 210, contacts 251, through the 500 ohm non-inductive resistance in the finder, and through contacts 253 and the upper winding of relay 210 to battery. Upon operating, relay 210 closes contacts 211 and completes an obvious circuit from contacts 256 to energize the winding of release relay 220. Upon operating, relay 220 closes contacts 224 to extend ground through the winding of the test relay 240 to the control wiper 275.

The vertical magnet 130 of the finder, upon operating, steps the wiper shaft of the Strowger mechanism of the finder switch one step in the vertical direction and closes contacts 131 to energize the interrupter relay (not shown) in the distributor. When energized, the interrupter relay operates and causes the vertical magnet 130 to restore. Upon restoring, the vertical magnet 130 interrupts at contacts 131, thereby to cause the interrupter relay to restore and again complete the circuit for energizing the winding of the vertical magnet, whereupon the vertical magnet 130 operates to step the shaft of the Strowger mechanism of the finder switch an additional step in the vertical direction and to recomplete at contacts 131 the circuit for energizing the interrupter relay in the distributor.

The interrupter relay in the distributor and the vertical magnet 130 in the finder switch continue to interact in the above-described manner, thereby to cause the shaft of the Strowger mechanism of the finder switch to be driven step by step in the vertical direction until the vertical wiper 132 engages a contact in the row of contacts associated therewith having marking ground potential placed thereon by the calling line. A circuit is then completed over wiper 132 for energizing the changeover relay in the distributor (not shown). Upon operating, the changeover relay in the distributor interrupts a point in the previous circuit for energizing the vertical magnet 130 and completes a point to energize the rotary magnet 140 through contacts 102. When energized, the rotary magnet 140 operates to step the wipers of the Strowger mechanism of the finder switch one step in the rotary direction and to complete, at contacts 141, an alternative circuit for energizing the interrupter relay in the distributor. When operated, the interrupter relay interrupts a point in the previous circuit for energizing the rotary magnet 140 thereby to cause the rotary magnet 140 to restore. Upon restoring, the rotary magnet 140 interrupts at contacts 141, thereby to cause the interrupter relay to restore and recomplete the point for energizing the winding of the rotary magnet 140.

The interrupter relay in the distributor and the rotary magnet 140 in the finder switch continue to interact in the manner described above until the wipers of the Strowger mechanism of the finder switch are rotated in the rotary direction to the position of the contacts set terminating the calling subscriber line, at which time the wiper 142 or 143, as the case may be, engages the contacts of the contact set terminating the control conductor 22 of the calling subscriber line, whereupon a circuit is completed for energizing the winding of the cut-off relay 30 in the line circuit in series with one of the test relays of the distributor over test lead 1 or 2.

When the cut-off relay 30 in the line circuit is energized, it does not operate due to the high series resistance of the test relay in the distributor. However the test relay (not shown) does operate. Assuming that the calling line is accessible to the upper wiper set of the finder switch, the first test relay in the distributor operates over test lead 1. Upon operating, the first test relay interrupts a point in the previous circuit for energizing the winding of the rotary magnet 140 and completes a circuit for energizing the switching relay 110 in the finder switch. In case the calling line is accessible to the lower wiper set of the wipers of the finder switch, the second test relay in the distributor would interrupt a point in the previous circuit for energizing the winding of the rotary magnet 140 and complete a circuit for energizing the upper winding of the switching relay 120 in the finder switch.

When operated, the switching relay 110 closes contacts 114, 112 and 111 to switch through to the succeeding switch and opens contacts 115 to prevent the energization of switching relay 120. It also opens contacts 116 to disconnect the release magnet 150, opens contacts 117 to disconnect the rotary magnet 140, and, at contacts 113, completes a locking circuit for itself of ground at contacts 104 or to ground on the C lead from the selector.

In case the switching relay 120 operates instead of switching relay 110, it operates contacts to perform functions similar to relay 110.

The lamp 101 connected to the control conductor 107 will not glow, until the required additional voltage from the booster battery is placed on the control lead by the manipulation of checking key 201 associated with the selector, which will be dealt with in a later paragraph.

Turning now to the calling line accessible to the upper wiper set of the finder switch, when the grounded control conductor 107 is connected to the control wiper 142 by contacts 114 in the specified manner as described above, an alternative circuit is completed for operating the cut-off relay 30 in the line circuit, this circuit extending from contacts 104, the control conductor 107, contacts 114, control wiper 142, the associated bank contact terminating the control conductor 22 of the subscriber line, contacts 21 and the winding of relay 30 to battery. When energized over the above-traced circuit, the cut-off relay 30 operates to complete, at contacts 31, a holding circuit for energizing the winding thereof, this circuit extending from the grounded control conductor 22 of the calling subscriber line by way of contacts 31 and the winding of relay 30 to battery. Also, upon operating, the cut-off relay 30 interrupts, at contacts 13 and 15, the previously traced circuit for energizing the line relay 10, thereby to cause the line relay 10 to restore.

It is to be noted that relay 220, upon operating, closes contacts 225 to extend ground potential from the checking key 201 by way of V. O. N. springs 6 and 5, to the upper winding of relay 230 to battery thereby establishing another holding circuit to maintain relay 230 when the finder start relay 100 restores. Upon operating, relay 230 closes contacts 232 to prepare a circuit for the winding of the vertical magnet 280 and to the lower winding of relay 230. It is also noted that relay 220, upon operating, closes contacts 225 to extend ground potential from the checking key 201 by way of contacts 225, contacts 242, control conductor 107, contacts 113, and the winding of relay 110 to battery. The same ground potential extends through another branch by way of contacts 114, control wiper 142, control conductor 22, contacts 31, and the winding of relay 30 to battery. These last two mentioned circuits serve to hold relays 110 and 30 when the finder start relay 100 falls back.

It is noted that line relay 10 has restored. Upon restoring it removes the ground potential at contacts 19 to release the distributor, which, in turn, restores the finder start relay 100. Upon restoring, relay 100 opens contacts 104 to take off the first applied ground potential from the control conductor 107, but in the meantime selector relay 220 has operated to apply another ground to maintain relays 110 and 30 operated, as already described. Relay 100, also opens contacts 106 to remove the 500 ohm resistance which was put across the calling subscriber line, line relay 210 now being held over the loop of the calling line.

In the case of a first selector, as soon as it is seized, dial tone is connected to the line of the calling person to indicate that a selector has been seized and that the dialling may proceed. This circuit extends from the dial tone and ground conductor 245 through cam springs 1 and 2, contacts 231, lower winding of relay 210, contacts 251 back to the calling subscriber line.

When the dial is operated, the current flowing through the telephone loop and relay 210 is interrupted and then re-established, once for each impulse. Relay 210, therefore, releases and operates in unison with the impulses; that is, if the digit 5 is dialled, relay 210 releases and reoperates five times. However, due to the fact that relay 220 is slow to release, it remains operated during impulsing to maintain the impulsing circuit to the vertical magnet and to keep the circuit to the relay 230 closed after the vertical off-normal springs have been operated. The first impulse will permit relay 210 to release and establish a circuit from ground, through contacts 256, 212, 222, 232, and the winding of the vertical magnet 280 to battery. A branch of this circuit extends through the lower winding of relay 230 to maintain this relay operated during the vertical operation after its initial energizing circuit over its upper winding is opened when the vertical off-normal contacts 6 and 5 open on the first vertical step.

When the vertical magnet 280 operates, it elevates the shaft one step and the wipers are in line with the first level of bank contacts. For each succeeding impulse of the digit series, the vertical magnet will operate and elevate the shaft and wipers one step or bank level and the relay 230 is again energized. During the time the shaft is being elevated on the first step, the off-normal springs are operated. Springs 5 and 6 open the initial energizing circuit of relay 230 which is maintained operated during the pulsing period over its lower winding. Springs 3 and 4 making contact prepare a circuit to the release magnet. Springs 1 and 2 making contact prepare a circuit to the rotary magnet 270. Relay 230 restores shortly after the pulsing period to complete the circuit for the rotary magnet. This circuit extends ground potential from contacts 221 by way of contacts 245, 257, contacts 272, rotary interrupter spring 271, vertical off-normal springs 1 and 2, contacts 233 and the rotary magnet 270 to battery. Upon operating, the rotary magnet 270 steps the wipers of the selector switch one step in the rotary direction, and interrupts at contacts 272, a point in the previously traced circuit for energizing the winding thereof, thereby to cause the rotary magnet 270 to restore. Upon restoring, the rotary magnet 270 recompletes, at contacts 272, the previously traced circuit for energizing the windings thereof.

The rotary magnet 270 continues to operate buzzer fashion, thereby to drive the wipers step by step in the rotary direction until the wiper set thereof engages a contact set in the contact bank terminating an idle trunk line having negative battery potential on its test contact. Further operation of the rotary magnet 270 is arrested when the wiper 275 of the wiper set engages the contact in the contact set being marked as idle by the presence of battery potential. This application of battery potential completes the previously mentioned circuit for energizing the winding of the test relay 240. Upon operating, the test relay 240 interrupts at contacts 245, a point in the previously traced circuit for energizing the rotary magnet 270, and completes, at contacts 244, a circuit for energizing the switching relay 250. This circuit extends from ground by way of contacts 221, 244 and the winding of relay 250 to battery. When energizing over the above-traced circuit, the switching relay 250 operates to complete, at contacts 258, a holding circuit for energizing the winding thereof. This circuit extends from the ground through contacts 262 of the checking key 201, common conductor 263, contacts 225, contacts 258, and the winding of relay 250 to battery. Also, upon operating, the switching relay 250 interrupts, at contacts 257, a further point in the previously traced circuit for energizing the winding of the rotary magnet 270. In addition, the switching relay 250 closes contacts 259 to cause ground potential from the succeeding switch, shortly after it is seized, to be applied to the control conductor 107 through contacts 113 and through the winding of relay 110 to battery, and also to hold relay 250 of the selector operated thereby to retain the finder switch and the selector switch in their operated positions. Meanwhile, the same ground potential is extended to the cut-off relay 30 by way of contacts 114, control wiper 142, control conductor 22, contacts 31 and the winding of relay 30 to battery with the result that the cut-off relay 30 has another holding circuit.

Also, upon operating, the switching relay 250 interrupts, at contacts 251 and 253, points in the previously traced circuit for energizing the line relay 210. At contacts 256 relay 250 opens the circuit to the slow to release relay 220. The line relay 210 immediately restores, and shortly thereafter relay 220 restores. Before relay 220 restores the line and release relays of the succeeding switch have operated and returned ground over wiper 275 for holding relays 250, 110 and 30 operated. Upon restoring, relay 220 opens contacts 224 to cause the test relay 240 to restore. At contacts 225 relay 220 opens the circuit to the checking key 201 to prevent application of booster battery in case the key 201 is operated and disconnects the holding ground through the checking key, after the holding circuit from the succeeding switch is established. At this time, the switching relay 250 in the first selector switch remains in its operated position due to the completed holding circuit for energizing the winding thereof including the control lead of the succeeding switch. Also, at this time, the succeeding switch is conditioned to be responsive to impulses transmitted thereto by way of the loop circuit extending thereto from the calling subscriber.

As already pointed out, the principal object of this invention is the provision of suitable circuit arrangements, whereby a signal is given to the maintenance man upon the operation of a checking key, whenever permanents exist on the line. The signal comprises the lamp 101, which is illuminated to indicate the existence of a permanent or a faulty line condition. Lamp 101 requires a voltage of 90 volts D. C. to start glowing. It, therefore, would not operate, until the booster battery is applied on the selector control lead. Should the selector switch through to the succeeding switch, relay 220 accordingly restores and opens contacts 225, so that the lamp 101 will not operate even though the checking key 201 is manually operated. On the contrary, assuming that the line which caused the operation of the finder and the seizure of the selector is faulty as described in the first paragraph of this specification, the first selector is seized but not switched through, relay 220 remains operated, and, therefore, contacts 225 remain closed. As soon as the checking key 201 is thrown, it opens contacts 262 and closes contacts 261, through which, the booster battery source 260 is placed on the control lead by way of the common conductor 263, contacts 225, 242, and control conductor 107 to the lamp 101, which is accordingly illuminated. The common checking key 201 is connected to all of the similar finder-selector links. Where the selector switches have been seized but not switched through due to faulty line conditions, the checking key, upon operation, will illuminate their associated permanent lamps, such as 101.

When this checking operation is performed only a few times a day during light traffic loads, a dry-cell 45-volt booster battery will suffice. However, by providing a separate 45-volt storage booster battery, instead of the dry-cell booster battery the checking key 201 could be omitted and the storage booster battery could be directly connected to contacts 225.

Referring now to Fig. 3, an alternative arrangement is made operative by providing a relay common to all of the finder switches of a line finder shelf and the common relay 300 is operated to light a common lamp 101′ when one of the finder test jacks is operated, only in case the selector switch associated with this one finder has not switched through. Fig. 3 schematically shows only the control conductor and connections thereto in one of the finder selector links, the remaining circuits being unnecessary to understand the invention and because the circuits not shown are identical to those for the finder and selector shown in Figs. 1 and 2. The corresponding apparatus in Fig. 3 has primed reference characters, for example relay 230′ in Fig. 3 corresponds to relay 230 of Fig. 2. and etc.

The finder switching relay 110′ is operated when the finder finds the calling line in the same manner as described for relay 110 of Fig. 1. The selector line relay, the selector release relay 220′ and the selector series relay 230′ operate in the same manner as described for the corresponding relays of Fig. 2. The vertical off-normal contacts 6′ open the circuit to relay 230′ when the selector is operated in its first vertical step, the selector test relay operates switching relay 250′ when the operated selector finds an idle trunk to seize a succeeding switch, and the seized succeeding switch sends direct ground back over test wiper 275′, contacts 259′ and 258′ to hold selector switching relay 250' operated and over conductor 107', and to hold finder switching relay 110' in a manner similar to that described for the selector of Fig. 2. When the selector switches through to the succeeding switch the line relay and release relay 220' restore; and relay 220' opens contacts 225' to disconnect the ground through resistance R from control lead 107' after direct ground has been placed on lead 107' over wiper 275' as described.

From the foregoing description it will be seen that if the selector of Fig. 3 is operated off-normal by dialling, direct ground is placed on control lead 107' from the succeeding switch. In those cases where the selector of Fig. 3 is seized but not operated, then contacts 225' connect ground through the low resistance R to the control lead 107'. A faulty line, such as a shorted line, would cause the selector to be seized by the finder but the selector would not be operated with the result that ground through resistance R is applied to the control lead 107' instead of direct ground as is done when the selector is operated and switches through. It is due to this reduced ground potential through the resistance R that enables the previously mentioned common relay 300 to operate and light the permanent lamp 101'.

For example on those finder-selector links in which the selectors have been operated and switched through, the common relay 300 is short-circuted when the associated finder test jack TJ is operated as follows: ground, through the winding of the marginal common relay 300, control lead 107', contacts 259', wiper 275' to ground on the control lead of the succeeding switch. Due to this short-circuit, relay 300 does not operate with the result that the lamp 101' is not illuminated.

In those finder-selector links in which the selector is seized and not operated, the relay 220' remains operated and a reduced ground potential is connected to control lead 107' instead of direct ground. Also, since the selector has not been operated, battery is also connected through the upper winding of relay 230' to the control lead. Battery through the upper winding of relay 110' is also connected to control lead 107'. Now when the test jack TJ is operated, current flows from ground through the winding of the common marginal relay 300, the operated test jack TJ, to control lead 107' and then in parallel through the upper winding of relay 230' and relay 110' to battery. The resistance R is of such value as to allow sufficient current to flow through the winding of relay 300 to cause it to operate even though it is partially shunted through resistance R. Lamp 101' operates when relay 300 is operated to indicate to the maintenance man that the line engaged by the finder of the operated test jack is in a permanent condition.

What is claimed is:

1. In a telephone system, a group of lines, a group of finder switches, a control lead in each of said finder switches, a glow discharge lamp connected in each finder to its control lead, a selector individually connected to each of said finder switches, a checking key common to said selectors, means responsive to a calling condition existing on one of said lines for operating one of said finders to find said line and seize the individually connected selector, means in said selector operated responsive to said seizure for operatively connecting the control lead of said one finder to said key; a circuit including a source of current, said key, said selector, said connecting means and said control lead of said one finder for operating the lamp in said one finder in response to the manual operation of said key in case said selector is seized but not operated; and means in said selector for opening said circuit in response to switching through operation of said seized selector under control of said calling line thereby preventing the operation of said lamp, even though said key is manually operated.

2. In a telephone system, a group of lines, a group of finder switches, a control lead in each of said finder switches, a glow discharge lamp connected in each finder to its control lead, a selector individually connected to each of said finder switches, a source of current, means responsive to a calling condition existing on one of said lines for operating one of said finders to find said line and seize the individually connected selector, manual means operative to connect said source of current to the finder control lead of said one finder, a circuit including said source of current, said selector, said manual means in operated position and said control lead of said one finder for operating the lamp in said one finder in case said selector is seized but not operated, and means in said selector for opening said circuit in response to switching through operation of said seized selector under control of said calling line thereby preventing the operation of said lamp in case said manual means is operated after operation of said selector.

3. In a telephone system, a group of lines, a group of finder switches, a control lead in each of said finder switches, a selector individually connected to each of said finder switches, a control lead in each selector connected to the control lead of its individually connected finder, means responsive to a calling condition existing on one of said lines for operating one of said finders to find said line and seize the individually connected selector, a relay common to said finders, a first test jack spring in each finder connected to its control lead, a second test jack spring in each finder connected to said common relay, a checking lamp controlled by said common relay, means in said selector operated responsive to said seizure for connecting the control lead of said one finder to ground through a low resistance, means dependent upon said low resistance ground connection for operating said common relay responsive to the manual closure of both said test jack springs of said operated finder to light said lamp in case said selector is seized but not operated, means for operating said selector to extend the calling line to a next succeeding switch, and means responsive to said extension for connecting said control lead of said one finder directly to ground to shunt out said common relay when said test jack springs are closed to thereby prevent the operation of said lamp.

4. In a telephone system, a calling line, a finder, a selector connected to said finder, a control lead in said finder, a control lead in said selector connected to said finder control lead, a lamp connected with said finder control lead, means responsive to a calling condition existing on said line for operating said finder to connect with said line and connect said selector thereto, a source of current, means including said source of current connected to said control leads for lighting said lamp in case said selector is seized but not operated, means controlled by the calling line for operating said selector to extend the calling line beyond said selector, and means in said selector operated in response to the extension of the calling line beyond said selector for disconnected said source from said control leads to thereby extinguish said lamp.

5. In a telephone system, a calling line, a finder, a selector connected to said finder, a control lead in said finder, a control lead in said selector connected to said finder control lead, a lamp, circuit connecting means connecting said lamp with said finder control lead, means responsive to a calling condition existing on said line for operating said finder to find said line and connect said line to said selector to seize said selector, a source of current, enabling means effective after seizure of said selector for connecting said source to said control leads and to said circuit connecting means for lighting said lamp in case said selector is seized by said calling line and said selector is not operated to further extend the connection by control over said line, means controlled over said line for operating said selector to switch through and extend the calling line beyond said selector by intermittently altering the calling condition on said line, and disabling means in said selector operated in response to the extension of the line beyond said selector for disabling said enabling means to thereby prevent illumination of said lamp.

6. In a telephone system, a calling line, a finder, a selector connected to said finder, a control lead in said finder, a control lead in said selector connected to said finder control lead, a lamp, circuit connecting means connecting said lamp with said finder control lead, a first potential current source of a given value, means responsive to a calling condition existing on said line for operating said finder to connect with said line and connect said selector thereto, enabling means effective after seizure of said selector for connecting said first source to said finder and selector control leads and to said circuit connecting means to thereby enable sufficient current flow over said control leads and said circuit connecting means to cause illumination of said lamp in case said selector is seized but not operated to extend the call, a switch accessible to said selector, means controlled by the calling line for operating said selector to select and seize said switch, a second potential source of current of a different value, means in said selected switch for connecting said second source to said selector in response to the seizure of said switch, and means including said seizing means in said selector operated by the selection of said switch for disabling said enabling means and for connecting said second source to said control leads and said circuit connecting means, and said second potential source being of such value that the current flow over said control leads and said circuit connecting means is insufficient to cause illumination of said lamp.

7. In a telephone system, a line, a finder, a selector connected to said finder, a control lead in said finder, a control lead in said selector connected to said finder control lead, means responsive to a calling condition existing on said line for operating said finder to connect with said line and seize said selector, a source of battery potential and a source of ground potential, a switch-through relay in said finder, means for connecting said battery source through the winding of said switch-through relay to said control leads in response to said connection of said finder to said line, a release relay in said selector operated in response to the seizure of said selector, a resistance in said selector, contacts closed by the operation of said release relay for connecting said ground source through said resistance to said control leads to hold said switch-through relay operated and for marking said line busy to other finders, a test jack in said finder having a pair of normally open springs, one spring being connected to said finder control lead, a marginal relay having one terminal of its winding connected to the other test jack spring and its other winding terminal connected to said ground source, manual closure of said test jack springs completing a circuit from said ground source through said marginal relay winding over said finder control lead and through the winding of said switch-through relay to said battery source for operating said marginal relay in case said selector is seized but not operated, said resistance connecting said ground potential to said control leads closing a resistance-shunt circuit around said marginal relay to permit sufficient current flow through said marginal relay and said switch-through relay to operate said marginal relay, means controlled over said line for operating said selector to extend the call beyond said selector, means responsive to the extension of said call beyond said selector for directly connecting said ground source to said control leads to close a direct shunt circuit around said marginal relay and prevent operation of said marginal relay when said test jack springs are manually closed, and a lamp illuminated by the operation of said marginal relay.

8. In a telephone system, a line, a finder, a selector connected to said finder, a control lead in said finder, a control lead in said selector connected to said finder control lead, means responsive to a calling condition existing on said line for operating said finder to connect with said line and seize said selector, a source of battery potential and a source of ground potential, a switch-through relay in said finder, means for connecting said battery source through said switch-through relay to said control leads in response to said connection of said finder to said line, a series relay in said selector, a circuit connecting said battery source through said series relay to said control leads, means for operating said series relay over said circuit in response to the operation of said finder, a release relay in said selector operated in response to the seizure of said selector, a resistance in said selector, contacts closed by the operation of said release relay for connecting said ground source through said resistance to said control leads to hold said switch-through and said series relays operated and for marking said line busy to other finders, a test jack in said finder having a pair of normally open springs, one spring being connected to said finder control leads, a marginal relay having one terminal connected to the other test jack spring and its other terminal connected to said ground source, manual closure of said test jack springs completing a circuit from said ground source through said marginal relay over said control leads and through said switch-through and series relays to said battery source for operating said marginal relay in case said selector is seized but not operated, said resistance connecting said ground potential to said control leads closing a resistance-shunt around said marginal relay and being of such a value as to permit sufficient current flow through said marginal relay to operate said marginal relay, means controlled over the line for operating said selector to extend the call beyond said selector, means responsive to the extension of said call beyond the selector for disconnecting said battery source through said series relay from said control leads and for directly connecting said ground source to said control leads to close a direct shunt around said marginal relay and prevent operation of said marginal relay when said test jack springs are manually closed, and a lamp illuminated by the operation of said marginal relay.

No references cited.